Figure 1:
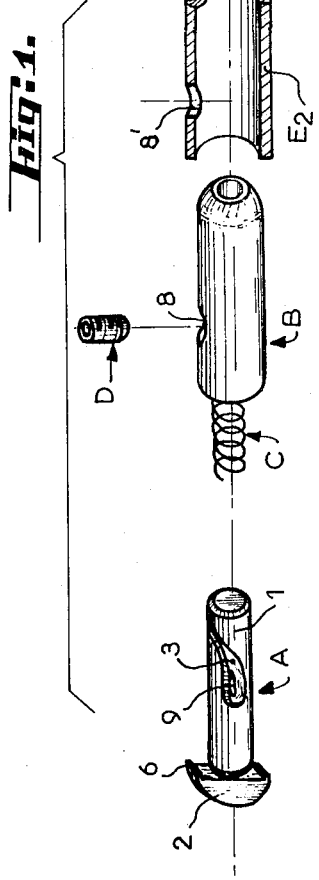

United States Patent [19]
Condevaux

[11] 3,795,453
[45] Mar. 5, 1974

[54] FRAMEWORK ASSEMBLING MEMBERS

[76] Inventor: Georges Julien Condevaux, 159, rue Blomet, 75015 Paris, France

[22] Filed: July 7, 1972

[21] Appl. No.: 269,526

[30] Foreign Application Priority Data
July 7, 1971   France .............................. 71.24863

[52] U.S. Cl. .................... 403/3, 52/754, 52/753 E, 52/645, 256/65
[51] Int. Cl. ............................................. F16b 7/00
[58] Field of Search ...........287/189.36 R, 189.36 C, 287/189.35, 54 A, 54 B, 54 C, 189.36 H, 20.92 E, 127, 20 R, 20.924, 20.925, 20.926, 20.927, 20.92 C; 52/285, 475, 656, 645

[56] References Cited
UNITED STATES PATENTS

| | | | |
|---|---|---|---|
| 1,891,048 | 12/1932 | Keefe............................. | 287/124 X |
| 2,654,933 | 10/1953 | Hecht ......................... | 287/189.35 X |
| 2,676,680 | 4/1954 | Kindorf........................... | 287/189.35 |
| 3,280,439 | 10/1966 | McCarthy ......................... | 287/20 R |
| 3,389,930 | 6/1968 | Ashworth et al. ........... | 28/189.36 H |
| 3,537,736 | 11/1970 | Kroop .............................. | 287/54 C |

Primary Examiner—Jordan Franklin
Assistant Examiner—Wayne L. Shedd

[57] ABSTRACT

In a framework built from section elements, some of which are formed with a sidewall constituted by spaced flanges defining a semi-closed slot, an assembling member essentially comprised of a stem secured in one end of a first element by a set screw, and of an oblong head to be fitted in the slot of a second section element. Said stem is formed with a large-pitch helical groove registering with said screw and terminating in a locking cavity, whereby pressing said second element on said first element causes said head to be rotated into locking position transversely of said slot, and tightening of said screw in said cavity causes said flanges of said second element to be clamped between said head and said first element.

8 Claims, 3 Drawing Figures

PATENTED MAR 5 1974  3,795,453

FRAMEWORK ASSEMBLING MEMBERS

The present invention relates generally to the assembling of frameworks whose elements are formed of section lengths, and concerns more precisely a member for assembling the end of a tubular element to a section comprising at least one plane face provided with a semi-closed slot, the said member being essentially constituted by a stem intended to be inserted into the tubular element and carrying an oblong head provided with parallel flanks and intended to be inserted, at any desired point, into the slot of the section and then locked in the latter by being given a quarter turn, the said stem being secured in assembled position in the said tubular element by means of a set screw.

The presently known assembling members of this type have various drawbacks which appear more particularly during the process of assembling of the framework elements.

Indeed, the assembling of two framework sections, e.g. a framework cross-member and upright, by means of such a member requires that the oblong shape of the said member be inserted and then locked in the slot of the upright by being given a quarter turn before its stem mounted in the tubular end of the cross-member is secured in assembled position by means of the said screw. During this process the head of the assembling member is not retained in the required position and therefore tends, on the one hand, to slide along the upright and, on the other hand, to pivot with respect to the cross-member, thus rendering difficult the required positioning of the assembly. A series of handlings are therefore necessary to ensure the correct locking position of the head and require great concentration and considerable skill on the part of the person performing the assembling operations.

The present invention is directed at avoiding the said draw-backs by providing an assembling member of original design ensuring a correct positioning of all its members at each moment during the assembling process, so as to considerably simplify the latter by doing away with any handling requiring special manual skill on the part of the person performing the assembling operations.

To this end, according to a first feature of the invention, the said set screw is engaged in a large-pitch helical groove extending over a quarter turn round the stem of the assembling member, so as to move its head to locking position in the slot of the section by means of a simple axial pressure, the said groove terminating in a cavity whose position and shape ensure the clamping of the flanges of the slotted section between the head of the said member and the end of the said tubular element.

According to another feature of the invention, the assembling member is normally ready for use owing to the action of a resilient element such as a helical spring mounted in the said tubular element and tending to drive out the stem from the said member to move the head to inserting position in parallel relationship to the slot of the section.

According to another aspect of the invention, the said cavity is advantageously so shaped as to form an axial guide way, the depth of which increases towards the head of the assembling member, so as to ensure a reliable tightening of the assembly irrespective of the machining tolerances.

Figure 2:
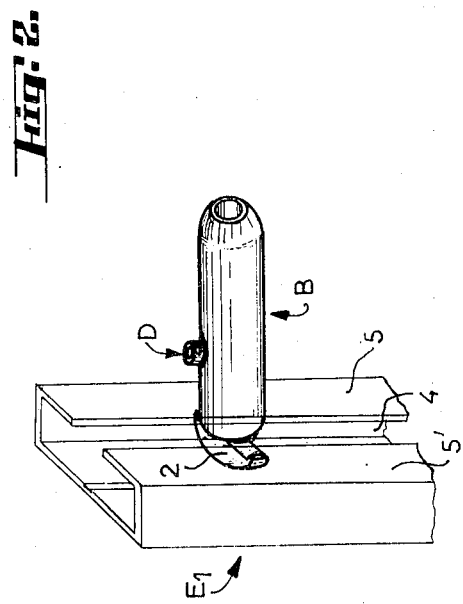
Figure 3:
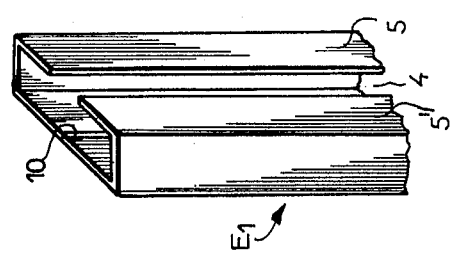
Figure 3:
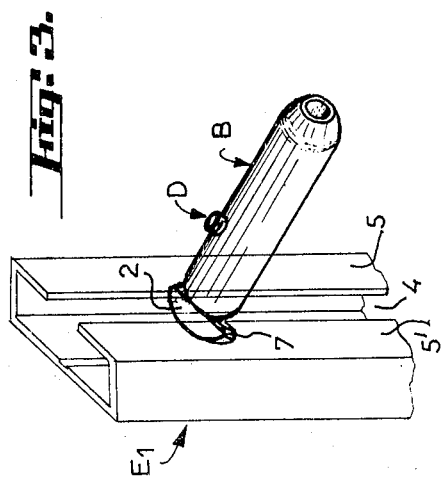

Other features and advantages of the invention will appear more clearly from the following detailed description of one form of embodiment given by way of example and illustrated by the appended drawings wherein:

FIG. 1 is an exploded perspective view illustrating the assembling of a framework upright and cross-member according to the invention; and FIGS. 2 and 3 are perspective views illustrating the assembly in locked position, the cross-member (not shown) being respectively perpendicular and oblique with respect to the upright.

As shown in the drawing, the assembling member A is associated with a sleeve B, a helical spring C and a guiding and tightening screw D to form an assembling unit which is mounted axially, in a manner known per se, in the tubular end portion of a framework element $E_2$ forming a cross-member and intended to be assembled to a section $E_1$ forming an upright.

The assembling member A of the invention is constituted by a cylindrical stem 1 carrying an oblong head 2 provided with parallel flanks. The stem 1 is also provided with a helical groove 3. The head 2 is so shaped as to be inserted at any required point and then locked by being given a quarter turn in the upright $E_1$ constituted by a section comprising a plane face provided with a medial semi-closed slot 4. Therefore, the width and length of the head 2 are respectively smaller and greater than the width of the slot 4, so that it can be freely inserted into the said slot when held in parallel relationship to the latter, and it can thereafter be rotated to locking position by being given a quarter turn so as to firmly anchor its bearing face on the internal face of the flanges 5, 5' defining the slot 4. To this end, the said bearing face is edged along its shorter side with projections 6 intended to be impressed, when the assembly is tightened, into the flanges 5, 5' defining the slot 4. According to another form of embodiment, the longer sides of the said bearing face may be bevelled to enable the framework elements to be assembled not only at right angles to one another as shown in FIG. 2, but also in an oblique position as shown in FIG. 3, in which case the bearing face is constituted by the bevels 7.

The end of the stem 1 opposite the one carrying the head 2 and provided with the helical groove 3 is freely inserted into the sleeve B which is itself introduced into the tubular end of the cross-member $E_2$. These three elements are connected to one another by means of a set screw D screwed into a tapped hole 8 provided in the wall of the sleeve B and the head of which passes freely through a corresponding hole 8' provided in the wall of the tubular cross-member $E_2$, whereas the opposite end of the said screw is engaged into the helical groove 3 of the stem 1 of the assembling member A. According to an essential aspect of the invention, the axial and angular position of the end of the groove 3 is determined according to that of the holes 8, 8', so that when the screw D is located at the end of the groove, the head 2 of the assembling member projects outwardly from the sleeve B and, in addition, is arranged in parallel relationship to the slot 4 of the upright $E_1$ when the cross-member $E_2$ is in assembling position. Advantageously and as shown in FIG. 1, a helical spring C is placed between the partially inserted bottom of the sleeve B and the end of the stem 1 of the assembling member A, so as to normally retain these elements in the relative position just described. According to another essential aspect of the invention, the other end of the groove 3 terminates in a setting/cavity 9 provided at the periphery of the stem 1 of the assembling member A and the axial and angular position of which is such that it reaches the screw D when the assembling member A is given a quarter turn with respect to the sleeve B and a sufficient length thereof is introduced into the sleeve to ensure a reliable clamping of the flanges 5, 5' of the upright $E_1$ between the head 2 of the said member and the end of the sleeve B and/or the tubular cross-member $E_2$.

According to a preferred form of embodiment of the invention, the set cavity 9 is advantageously so shaped as to form an axial guide way, the depth of which increases towards the head 2 of the assembling member A, so as to enable the set point of the screw D on the surface of the said guide way and, therefore, the distance between the head 2 of the member A and the end of the sleeve D, to be automatically adapted to the actual thickness of the flanges 5, 5' of the upright $E_1$ irrespective of the machining tolerances.

The assembling of the cross-member $E_2$ to the upright $E_1$ by means of the assembling unit just described is carried out in the following manner.

After the assembling unit A-D is mounted in the tubular cross-member $E_2$, the latter is placed in assemblng position before the upright $E_1$. The screw D being partially untightened, the head 2 of the assembling member A is retained by the action of the spring C in inserting position, i.e., in parallel relationship to the slot 4 of the upright $E_1$. It is then sufficient to axially press the cross-member $E_2$ against the upright $E_1$ thus bringing the head 2 of the assembling member into abutment against the rear wall of the slot 4 of the upright, therefore causing the said member to be given a quarter turn, the head 2 thus being moved to locking position in the slot of the upright $E_1$. In order to facilitate this operation, the rear wall of the slot 4 of the upright is advantageously provided with a medial furrow 10 ensuring the centering of the budged head of the assembling member A. The assembly thus arranged in assembled position by means of a simple axial pressure can be secured in this position by simply tightening the said screw D which co-operates with the inclined guide way formed at the bottom of the cavity 9 to ensure a reliable tightening of the cross-member $E_2$ against the upright $E_1$.

The assembly thus obtained may also be undone quite conveniently by simply untightening the said screw D, thus allowing the pressure spring C to move the head 2 of the assembling member A to a position parallel to the slot 4 of the upright $E_1$. It is thus sufficient to pull on the cross-member $E_2$ to remove the head of the assembling member from the slot 4 of the upright $E_1$. The mounting and dismounting of an assembly according to the invention are thus performed by simply bringing together or moving apart axially the end of the cross-member and the appropriate face of the upright, without there being any need of relative rotation of these framework elements. Consequently and contrary to the arrangements of the prior art, the invention enables two or several framework elements to be secured to one another at any desired angle by means of several parallel assembling members, since the latter can be simultaneously brought to tightening position by simply bringing together the framework elements.

However, the advantages inherent in the invention depend upon a correct guiding of the assembling member in the associated sleeve and upon a correct angular positioning of the latter in the framework element concerned. Should the set screw be insufficient to fulfil these two functions, the assembling unit according to the invention may still be improved as follows.

In order to ensure a perfect guiding of the assembling member in the associated sleeve, its stem may be provided with at least one additional groove corresponding to the aforesaid helical groove and setting cavity and in which is engaged a pin projecting from the internal wall of the sleeve. The said pin may also serve to prevent the separation of the assembling member from its sleeve in the absence of the said screw.

In order to ensure the angular positioning of the sleeve in the framework element concerned, one of these members, or both, may be provided with at least one axial slot in which is engaged a projection, for instance a rib, formed on the other member.

Of course, the invention is by no means limited to the form of embodiment described and illustrated which has been given by way of example only. On the contrary, the invention comprises all the means constituting technical equivalents to the means described as well as their combinations, should the latter be carried out according to the spirit of the invention.

What is claimed is:

1. Member for assembling one end of a tubular element to a section element formed with at least one plane sidewall consisting of spaced flanges defining a semi-closed slot; the said member being essentially constituted by a stem carrying an oblong head formed with parallel flanks; said stem being adapted to be fitted axially into said end of said tubular element and secured therein by a set screw located at a predetermined distance from said end; said head being adapted to be inserted at any desired point into said slot when positioned parallely thereto, and then to be locked under said flanges by being given substantially a quarter turn for being positioned substantially transversely of said slot; characterized in that said set screw is engaged in a large-pitch helical groove extending substantially over a quarter turn round said stem and terminating in a locking cavity located adjacent to said head at a distance therefrom substantially equal to said predetermined distance; whereby said head can be successively inserted into said slot, given said quarter turn and locked under said flanges by a single operation consisting in pressing said end of said tubular element onto said sidewall of said section element; the location and shape of said locking cavity on said stem being such that tightening of said set screw therein ensures the clamping of said flanges between said end of said tubular member and said head of said assembling member.

2. Assembling member according to claim 1, characterized in that a helical spring or like resilient element is operatively mounted in said tubular element for axially urging said stem out therefrom and thereby rotating said head to inserting position.

3. Assembling member according to claim 1, characterized in that said locking cavity forms a guide way extending axially on said stem and the depth of which increases towards said head, so as to ensure a reliable clamping of said flanges irrespective of the manufacturing tolerances with respect to the aforesaid dimensions.

4. Assembling member according to claim 1, characterized in that the end surface of said head of said assembling member is symetrically bulged, whilst the bottom surface of said slot of said section member is provided with a furrow extending along the median plane of said slot.

5. Assembling member according to claim 1, characterized in that said tubular element consists of a sleeve fitted into one end of a second section element to be assembled at an angle to said first section element.

6. Assembling member according to claim 5, characterized in that complementary means are provided for preventing the separation of said sleeve from said assembling member.

7. Assembling member according to claim 5, characterized in that said sleeve and said second sectional element are provided with respective complementary means for preventing rotation of said sleeve within said element.

8. Assembling means according to claims 6, characterized in that said complementary means consists of said set screw, which extends through a hole in the wall of said second sectional element.

* * * * *